United States Patent
Harben et al.

[19]

[11] Patent Number: 5,927,555
[45] Date of Patent: Jul. 27, 1999

[54] PUMP SUPPORT APPARATUS FOR A MELTER TANK FOR THERMOPLASTIC MATERIAL AND MOUNTING STRUCTURE THEREFOR

[75] Inventors: William A. Harben, Dacula; Mark G. Reifenberger, Norcross, both of Ga.

[73] Assignee: Nordson Corporation, Westlake, Ohio

[21] Appl. No.: 08/833,940

[22] Filed: Apr. 14, 1997

[51] Int. Cl.⁶ .................................................. B67D 5/62
[52] U.S. Cl. ............................... 222/146.5; 222/146.5; 222/185; 222/239; 222/385; 222/410
[58] Field of Search ........................... 222/146.5, 185, 222/239, 385, 410

[56] References Cited

U.S. PATENT DOCUMENTS

| | | | |
|---|---|---|---|
| 3,964,645 | 6/1976 | Scholl | 222/146 HE |
| 3,981,416 | 9/1976 | Scholl | 222/146 R |
| 4,156,754 | 5/1979 | Cobbs, Jr. et al. | 222/146.5 |
| 4,474,311 | 10/1984 | Petrecca | 222/146.5 |
| 4,485,941 | 12/1984 | Frates et al. | 222/146.5 |
| 4,485,942 | 12/1984 | Petrecca | 222/146.5 |
| 4,592,491 | 6/1986 | Chollet | 222/146.5 |
| 4,667,850 | 5/1987 | Scholl et al. | 222/23 |
| 4,811,863 | 3/1989 | Claassen | 222/146.5 |
| 4,821,922 | 4/1989 | Miller | 222/77 |
| 5,143,255 | 9/1992 | Micek | 222/146.5 |

*Primary Examiner*—Joseph A. Kaufman
*Attorney, Agent, or Firm*—Wood, Herron & Evans, L.L.P.

[57] ABSTRACT

An apparatus for melting and dispensing thermoplastic materials such as thermoplastic adhesives referred to as "hot melt" adhesives. More specifically the apparatus includes a pump support which extends downwardly into a melter tank and which supports a rotary vertical pump shaft driving a pump located near the bottom of the melter tank. The pump support is configured to mount the pump shaft journal in a recess above the top of the melter tank and the rotation of the drive shaft adjacent to vertical columns of the pump support stirs the melted material in the melt tank.

22 Claims, 7 Drawing Sheets

5,927,555

PUMP SUPPORT APPARATUS FOR A MELTER TANK FOR THERMOPLASTIC MATERIAL AND MOUNTING STRUCTURE THEREFOR

FIELD OF THE INVENTION

This invention relates to an apparatus for melting and dispensing thermoplastic materials such as thermoplastic adhesives referred to as "hot melt" adhesives. More specifically this invention relates to a pump support which extends downwardly into a melter tank and which supports a vertical pump shaft driving a pump located near the bottom of the melter tank. The pump support is configured to mount the pump shaft journal in a recess above the top of the melter tank and to have open areas which leave the pump drive shaft exposed to the melted material to provide a stirring action on the material.

BACKGROUND OF THE INVENTION

There are many known types of apparatus for converting thermoplastic or so-called "hot melt" materials from a solid state to a molten liquid state. The melted material was maintained in the molten state in the tank in sufficient volume to supply one or more applicators or dispensers. A number of design improvements were made over a period of time to provide greater efficiency of the melt tanks and reduce problems of charring or oxidation of the molten material due to the material being maintained in the molten state for a prolonged period of time.

A grid type hot melt applicator was designed to have the capability of melting a very high throughput of thermoplastic material in a very short time so that the molten material was not maintained in a molten state for prolonged periods of time which could result in degradation of the material. A typical grid type applicator is disclosed in U.S. Pat. No. 3,964,645. Other examples are shown in U.S. Pat. Nos. 3,981,416, 4,474,311, 4,485,942, 4,667,850, and 4,821,922. Continued efforts to improve melter apparatus has resulted in the present invention.

OBJECTS OF THE INVENTION

A primary object of this invention is to provide a hot melt unit which is simple to construct and assemble and which can be produced at reduced cost to those devices of greater complexity.

Another object of this invention is to provide a hot melt unit having a pump support apparatus which cooperates with the rotating pump drive shaft to function as a mixing device for the molten liquid within the melter tank.

Another object of the invention is to eliminate the need for a resilient seal at the journal bearing of the pump drive shaft at the top of the melter tank by providing a recessed mounting for the journal bearing above the top of the melter tank.

These and other objects of the invention will become more fully apparent from the description in the following specification and the attached drawings.

SUMMARY OF THE INVENTION

The combination of a melter tank for thermoplastic material and a pump support apparatus for supporting a pump and pump drive shaft within the melter tank, the combination comprising: a melter tank having a top, a bottom, and sidewalls extending between the top and bottom, the top of the tank having a pump assembly hole, a drive mount attached the to top of the melter tank above the pump assembly hole, a drive shaft support member having axial bore means therethrough mounted vertically within the melter tank and having a top end attached to the drive mount and a bottom end attached to a pump mechanism, and a rotary drive shaft extending through the bore means with a top end of the drive shaft connected to a motor shaft and the bottom end connected to the pump mechanism to drive the pump mechanism when the drive shaft rotates, the drive shaft support member having open areas surrounding the drive shaft which permit portions of the drive shaft to come in contact with melted fluid material within the tank.

DESCRIPTION OF THE PREFERRED EMBODIMENTS

Figure 1:
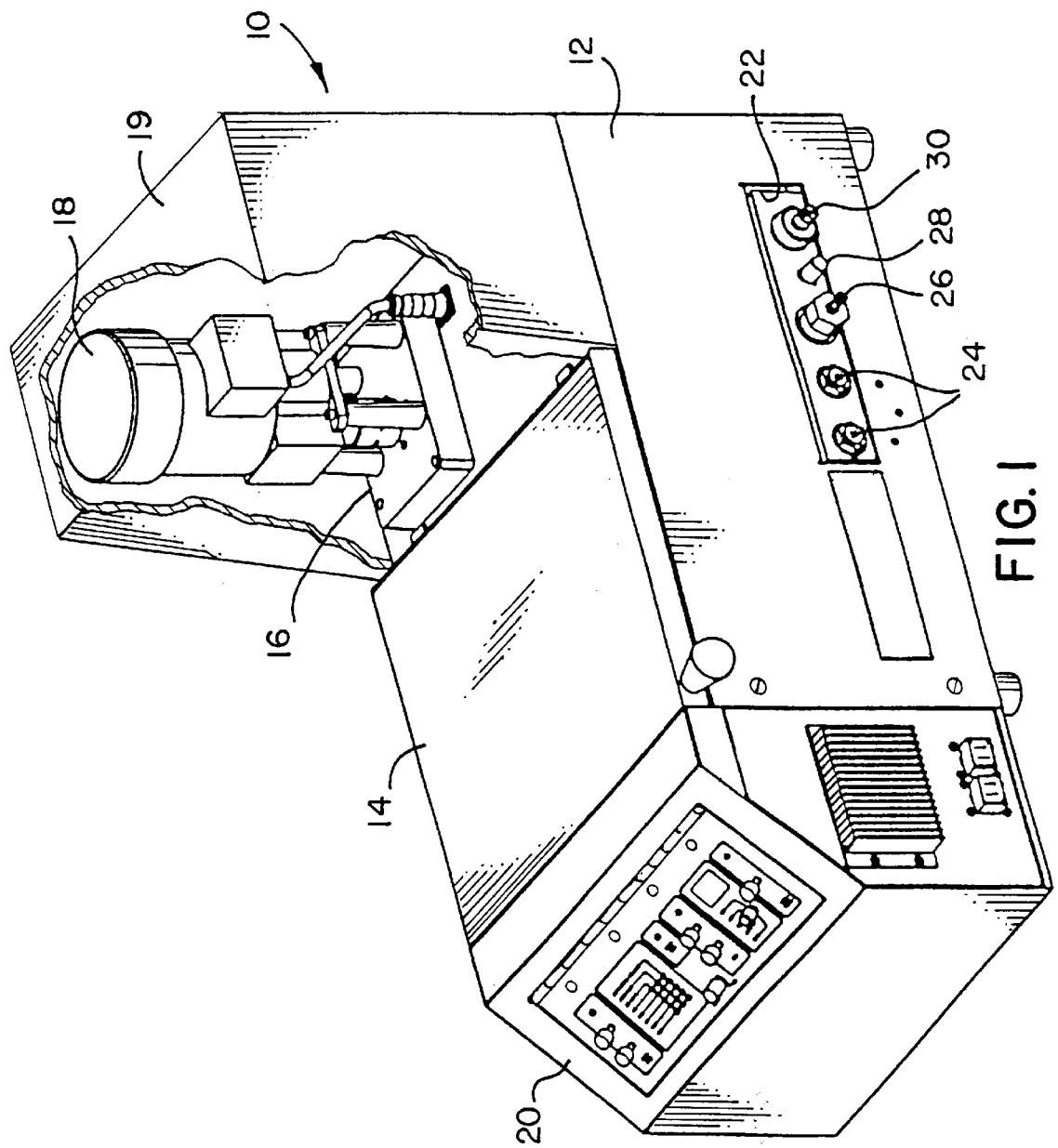
FIG. 1 is a perspective view of an entire assembly of a unit of melting apparatus for melting and dispensing thermoplastic material.

Referring now to the drawings and in particular to FIG. 1, a complete assembly of a melter unit for melting and dispensing thermoplastic material is indicated generally by the numeral 10. The unit 10 has a chassis 12 which also functions as a housing for the melt tank which will be shown and described later in FIG. 2. A hinged lid 14 is mounted on top of the chassis/housing 12. A pump assembly 16 driven by an electric motor 18 is mounted on one end of the chassis 12. A pump cover 19 rests on the top of the chassis 12 and covers the pump 16 and motor 18.

On the opposite end of the chassis 12 is an electrical control box 20 which will not be described in further detail since it is not part of the invention.

A manifold access opening 22 is provided on one side of the chassis 12. Extending from the opening 22 are hose ports 24, a pressure control 26, a drain 28, and a filter unit 30.

Figure 2:
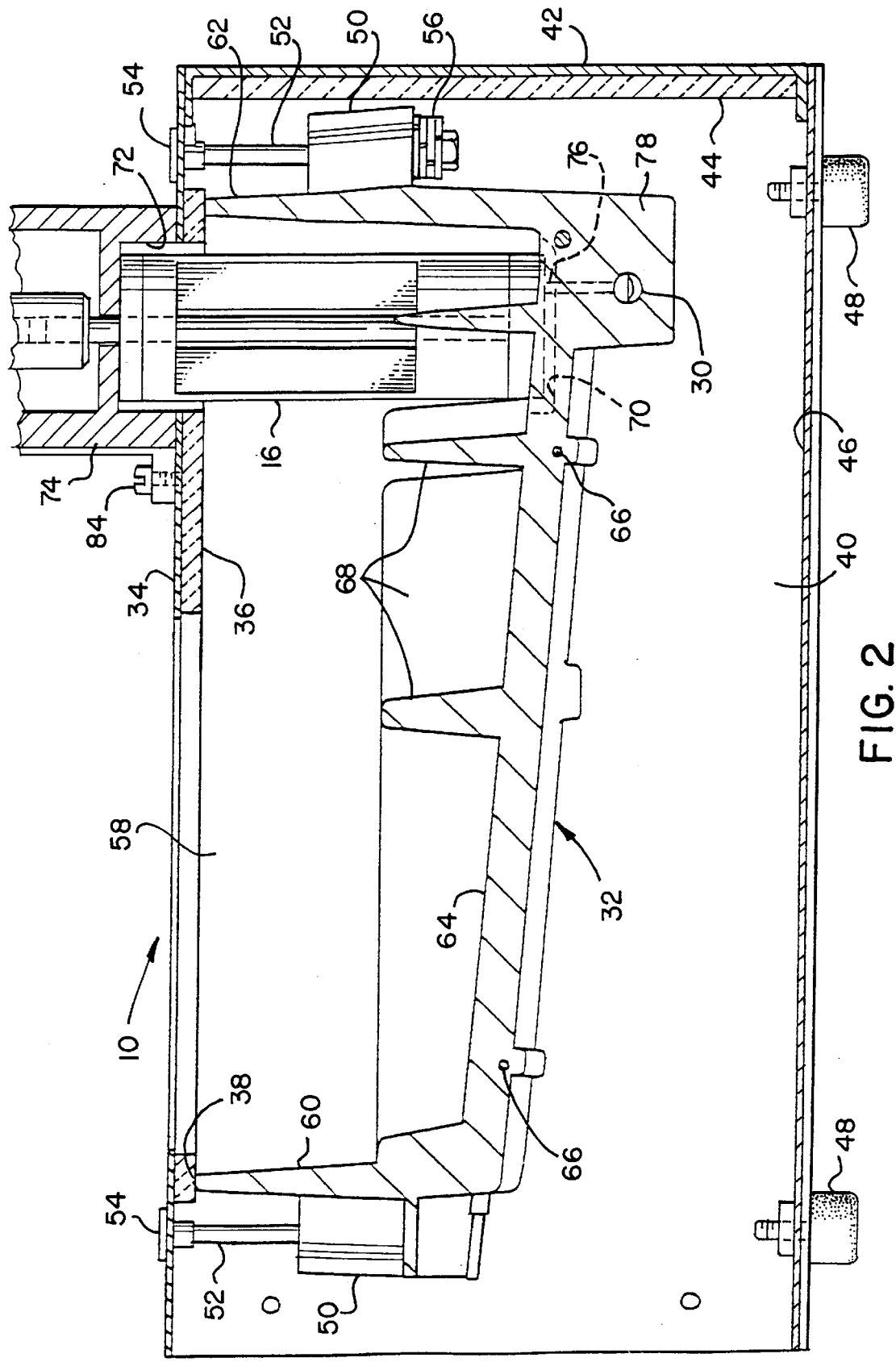
FIG. 2 is a cross sectional side view through a chassis and melter tank of FIG. 1 showing the pump support apparatus extending downwardly into the melt tank and having a shaft journal bearing recessed above the top of the melt tank.

Referring now to FIG. 2, a melt tank 32 is mounted in a suspended position from a top 34 of the chassis 12 and clamps a rigid insulation panel 36 between the top edge 38 of the tank 32 and the chassis top 34. The chassis 12 is of substantially rectangular shape as shown in FIGS. 1 and 2 and is stamped out of heavy gauge metal to support the weight of the melter tank 32. The chassis has a pair of sidewalls 40 one of which is shown in FIG. 2 and an end wall 42. The opposite end of the chassis 12 can also have a wall not shown separating the interior of the chassis from the control box 20. The inside of the chassis walls are preferably lined with flexible insulation panels such as the panel 44. This insulation reduces heat loss through the chassis and maintains more effective temperatures in the melter tank 32.

The chassis 12 has a removable bottom 46 and four resilient foot pads 48 located at each corner to serve as vibration dampers.

The melter tank 32 has a slotted mounting tab 50 mounted at each corner thereof. Each mounting tab 50 receives a vertically extending bolt 52 which engages a nut 54 fixed to the chassis top 34. A stack of "Belleville" washers 56 is carried on each bolt 52 between the bottom of the tab 50 and the bolt head. The washers 56 maintain the melter tank 32 tightly clamped against the insulation panel 36 and compensates for expansion and contraction of the bolts 52 due to temperature changes.

The melter tank 32 has sidewalls 58 one of which is shown in FIG. 2 and end walls 60 and 62. The tank 32 has an inclined bottom 64 which slopes diagonally from a high corner to a low corner shown at the right of the tank 32 in FIG. 2. The tank bottom 64 has a sinuous pattern of electrical resistance heating wires 66 embedded therein, which generate heat to melt the thermoplastic material in the tank. Such heating wires are well known in this type of melter tank and will not be described in further detail. A plurality of fins 68 extend upwardly from the tank bottom 64 and serve as a means of increasing heat transfer from the tank bottom 64 to the molten material within the tank 32.

At the low corner of the tank 32 is a pump recess 70 which extends into the tank bottom 64 below the top surface thereof.

The pump assembly 16 is mounted in a pump access opening 72 in the chassis top 34 by means of a drive mount 74 attached to the chassis top 34. The pump assembly 16 extends downwardly to near the bottom of the pump recess 70. In operation the pump 16 draws in molten material from the recess 70 and passes it through a drop tube 76 into a manifold portion 78 where it passes through the filter unit 30 and then to a duct (not shown) and to hose ports 24.

Figure 3:
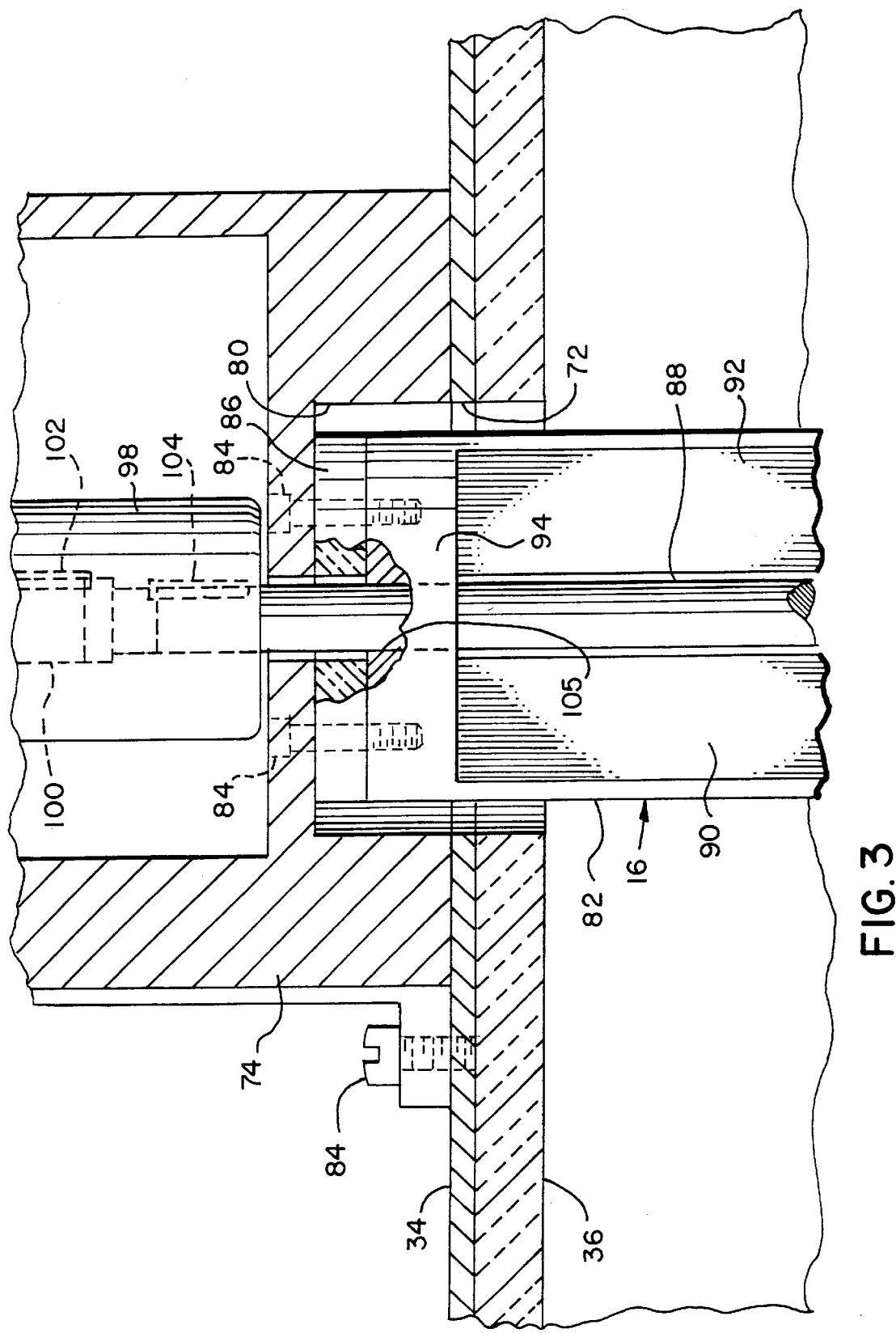
FIG. 3 is an enlarged fragmentary cross sectional view of the shaft journal bearing shown in FIG. 2.

Referring to FIG. 3, the pump assembly 16 is shown in an enlarged view from that in FIG. 2. The assembly 16 is mounted in pump access opening 72 by the drive mount 74. The drive mount 74 has an upwardly extending cylindrical recess 80 which receives the upper end of a pump support body 82 connected to the drive mount 74 by screws 84. A rigid insulator plate 86 is positioned on top of the pump support body 82 to prevent heat transfer from the inside of the melter tank 32 to the drive mount 74 and the drive motor 18.

Figure 5:
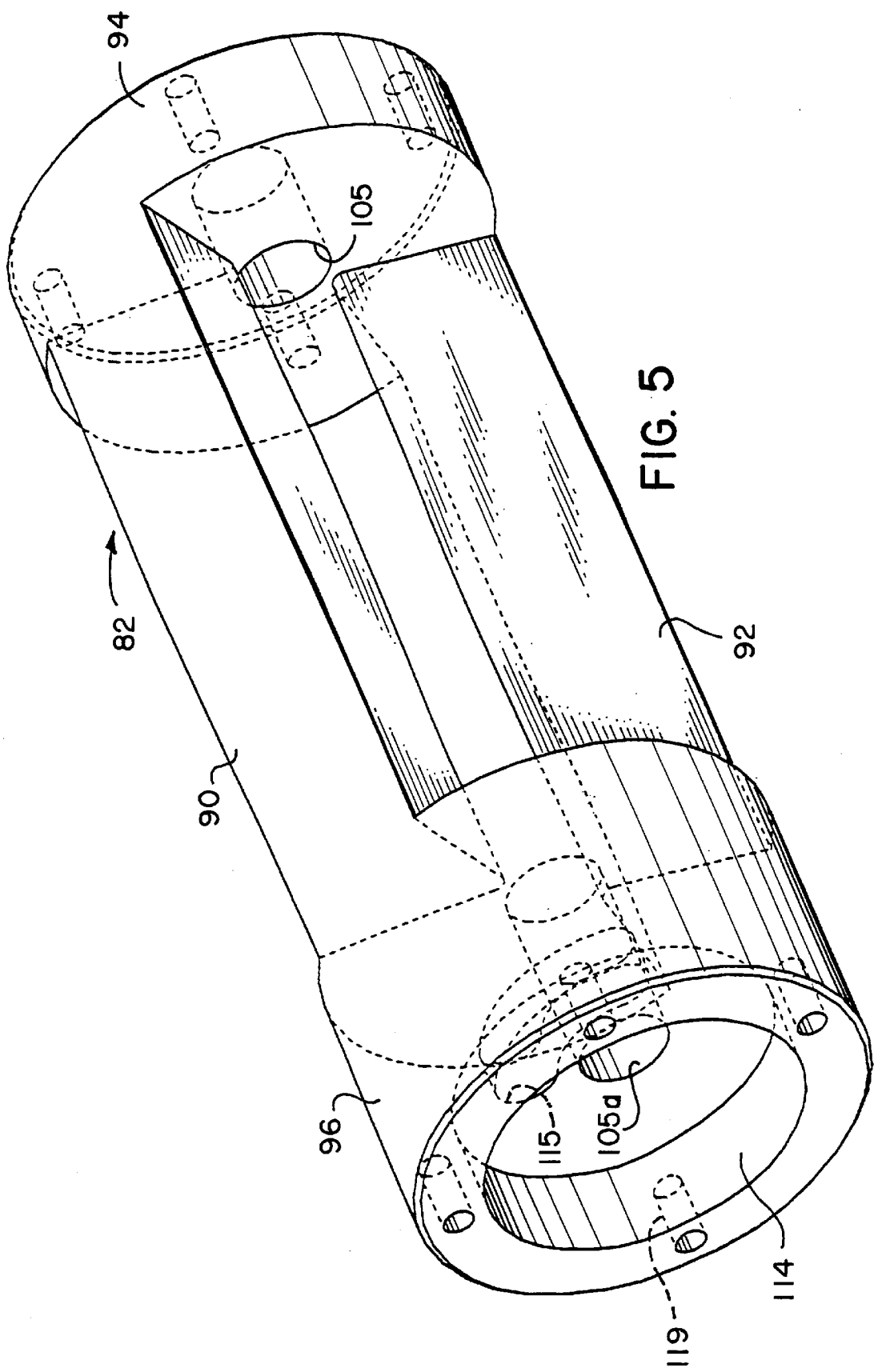
FIG. 5 is a perspective view of the pump support apparatus shown in FIG. 2.
Figure 6:
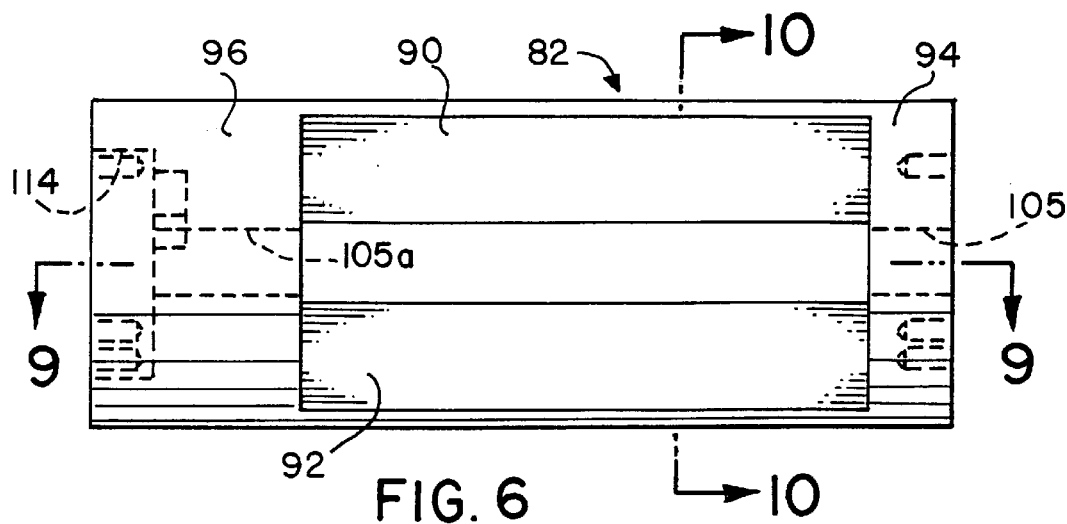
FIG. 6 is a side view of the pump support apparatus of FIG. 5.
Figure 7:
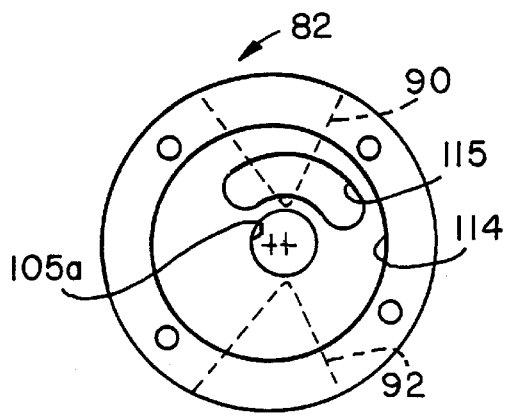
FIG. 7 is a bottom end view of the pump support apparatus of FIG. 6.
Figure 8:
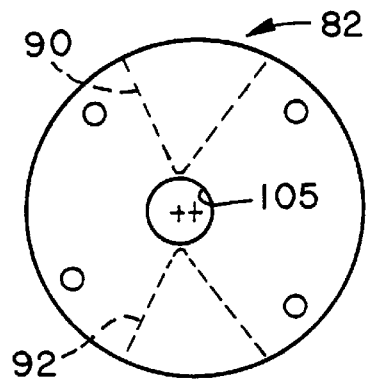
FIG. 8 is a top end view of the pump support apparatus of FIG. 6.
Figure 9:
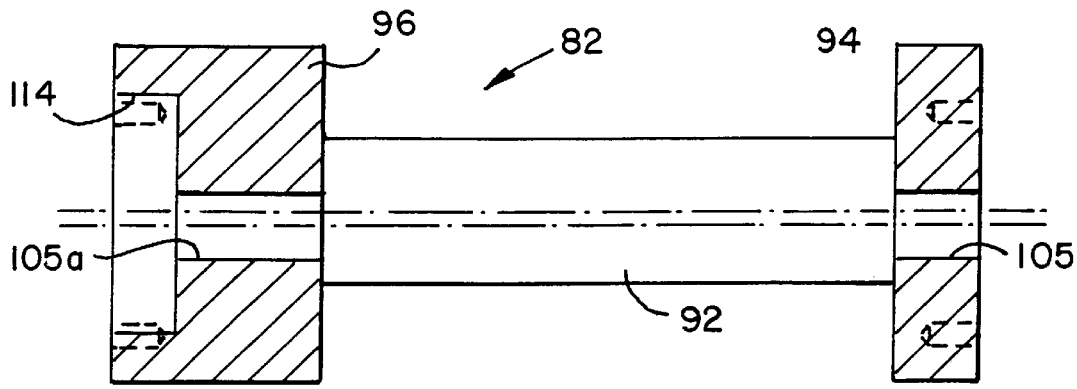
FIG. 9 is a cross sectional view of the pump support apparatus taken on line 9—9 of FIG. 6.

A pump drive shaft 88 is rotatably mounted within the pump support body 82 and extends vertically between two vertical columns 90 and 92 which extend between a top portion 94 and a bottom portion 96 as shown in FIG. 5 and which will be described in further detail later. The upper end of the shaft 88 extends upwardly from the top portion 94 of the body 82 and through the drive mount 74 into a coupling sleeve 98 where it is joined with a power shaft 100 from the motor 18 by keys 102 and 104.

The pump drive shaft 88 passes through a hole 105 in the top portion 94 and forms a journal bearing therewith which is positioned above the chassis top 34 in the recess 80. Since the journal bearing is above the top 34 it is above the level of molten material within the melter tank 32 therefor a resilient seal is not required to prevent molten material from seeping out in the journal bearing area of the drive shaft 88.

Figure 4:
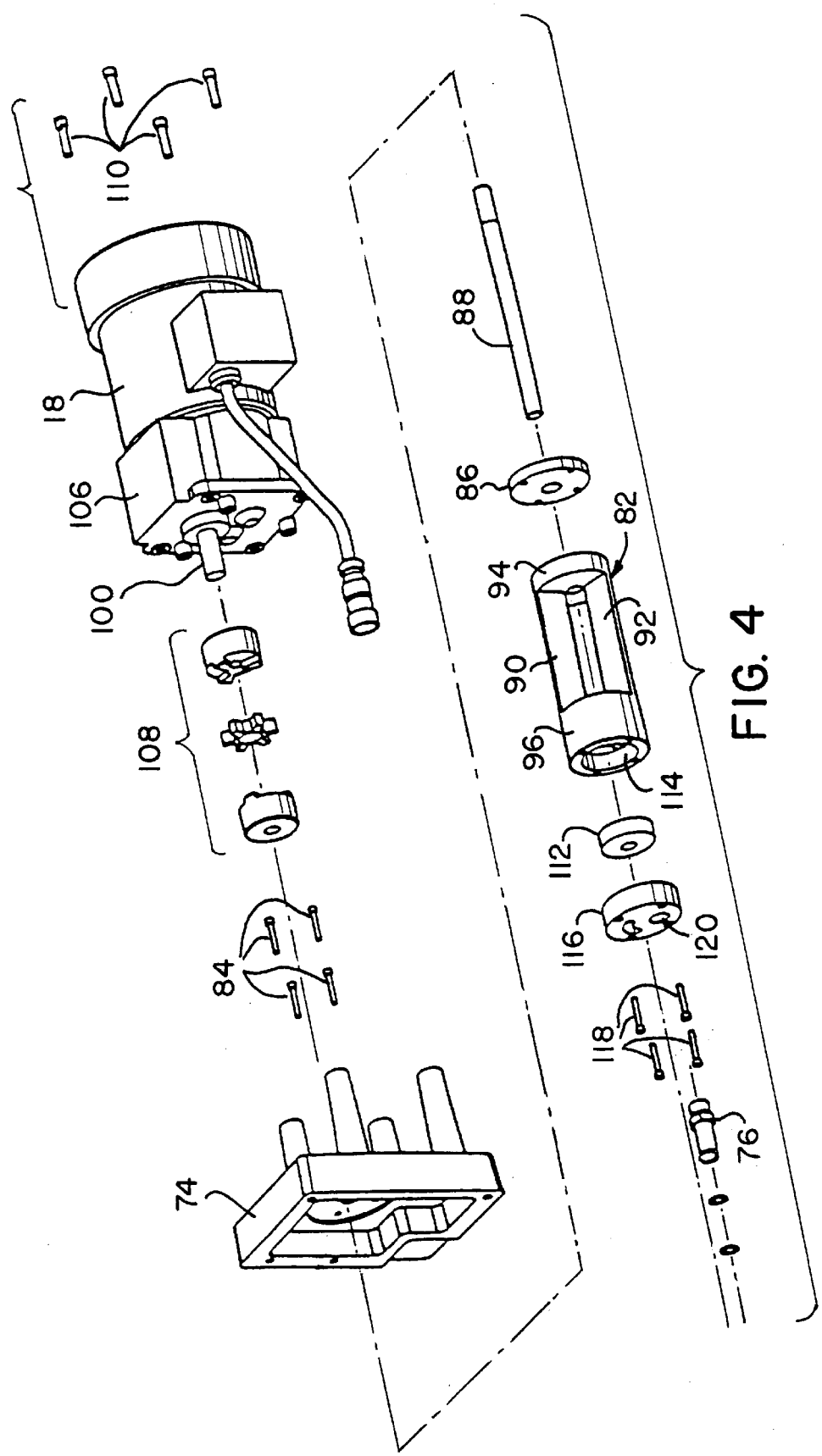
FIG. 4 is an exploded perspective view of the pump motor, the pump support apparatus and the pump for the melter tank assembly shown in FIGS. 1 and 2.

Referring now to FIG. 4 an exploded view of the pump assembly 16 and motor 18 is provided to show the manner in which the various parts fit together. The motor 18 has a gear box 106 attached to its lower end and the power shaft 100 extends from the gear box 106. A coupling assembly 108 connects the power shaft 100 and the pump drive shaft 88 as an alternate form of connection to the sleeve 98 shown in FIG. 3. The motor 18 and gear box 106 are secured to the drive mount 74 by screws 110. The drive mount 74 is in turn, secured to the chassis top 34 by the screws 84. The shaft 88 extends from the coupling assembly 108 through the drive mount 74, then through the insulator plate 86 then through the pump support body where it rotatably engages a gear set 112 which fits into a cylindrical recess 114 in the bottom portion 96. The preferred gear set 112 is the type which is know as a "Gerotor" gear set. The flow of liquid material through the pump is induced by the intermeshing action of the gears as they rotate. The receess 114 has a kidney shaped recess 115 which cooperates in communication with gear set 112. The gear set 112 is retained in the recess 114 by a pump end plate 116 which is held in place by screws 118 which are screwed into threaded holes 119 in the bottom portion 96 of the pump support body 82. The drop tube 76 mentioned earlier connects into an outlet opening 120 on the end plate 116 and has its opposite end connected through the filter 30 to ducting within the manifold portion 78.

For purposes of illustration a "Gerotor" type pump is shown which uses intermeshing gears to move the molten material from the pump recess 70 into the manifold portion 76, however other types of pumps can also serve this function.

Figure 11:
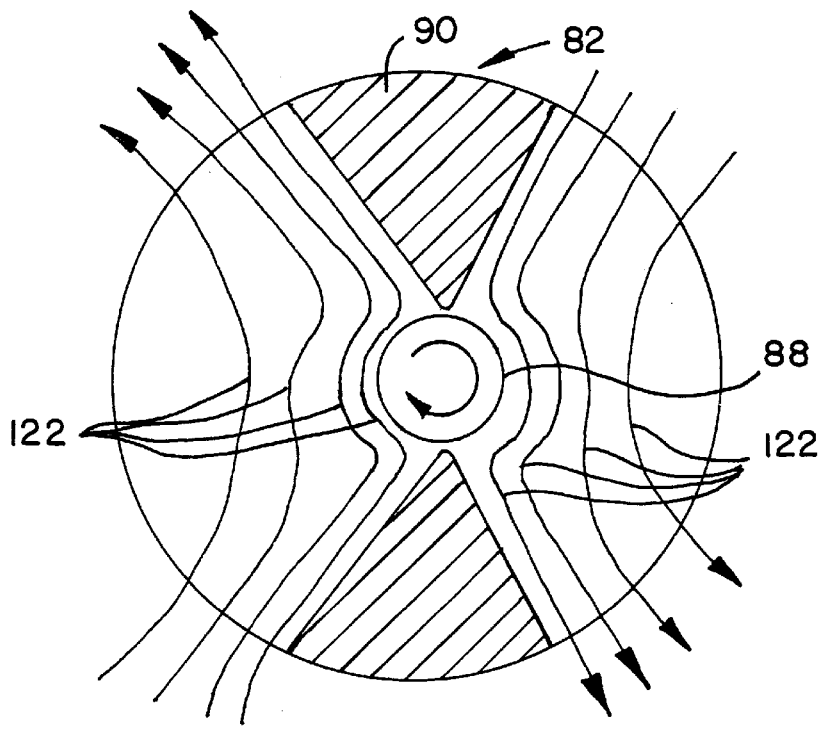
FIG. 11 is a cross sectional view similar to FIG. 10 but showing the flow lines of molten material caused by rotation of the pump shaft adjacent to vertical columns of the pump support apparatus.

Referring to the pump support body 82 in more detail, the vertical columns 90 and 92 are of prism or wedge shaped cross section with a sharp part of the wedge of each column coming in close proximity to the rotatable drive shaft 88 as shown in FIG. 11. This functional relationship of the shaft 88 and the columns 90 and 92 is designed to set up a particular flow pattern of molten material within the melter tank 32 when the drive shaft 88 is rotated. This flow pattern in represented by the arrows 122 in FIG. 11. The proximity of the columns 90 and 92 to the rotating shaft 88 creates a wiping action which prevents an excess of buildup of material on the shaft 88 and also prevents the material of creeping up the shaft and seeping out of the journal bearing area where the shaft 88 extends through the hole 105. The rotation of the shaft 88 keeps the molten material in motion within the tank in a stirring action and thereby lessens the chances of charring of the material which might otherwise occur in the material remained unstirred in the tank 32 for any length of time.

Figure 10:
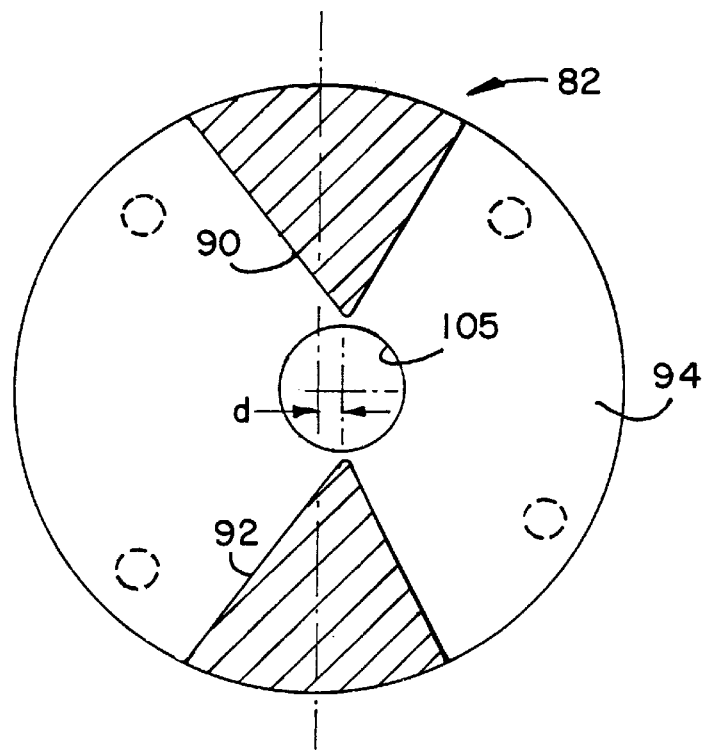
FIG. 10 is a cross sectional view of the pump support apparatus taken on line 10—10 of FIG. 6.

As shown in FIG. 10, the hole 105 is offset a distance "d" from the axial centerline of the body 82. Likewise the hole 105a through the bottom portion 96 is also offset so that when the drive shaft 88 is positioned in the body 82 it is axially aligned in the proper location to engage the gears in the gear set 112. If some other types of gear sets are used, this offset of the shaft 88 may not be necessary.

While a particular configuration of pump support apparatus such as the pump support body 82 shown herein is mounted with the top of the body extending into a recess 80 above the chassis top 34 as shown in FIG. 3, this same pump support body 82 could also be mounted flush with the chassis top. In such an arrangement a resilient seal ring might be needed to prevent molten material from creeping up the drive shaft 88 and seeping out of the hole 105.

It should also be recognized that the concept of using a recessed drive mount 74 can also be used with different pump support body configurations other than that of support body 82 shown in FIG. 5.

These as well as other modifications can be made in the device shown herein without departing from the scope of the invention.

We claim:

1. A pump support apparatus for supporting a pump within a melter tank for thermoplastic material, the apparatus comprising:
   - a first support member;
   - a second support member;
   - at least two spaced apart columns extending between the first and second support members;
   - a rotary drive shaft extending between the columns and adapted to connect to said pump to drive the pump when the drive shaft rotates;
   - the parallel columns each having a radially innermost portion in close proximity to the drive shaft to interact with the drive shaft as it rotates and effect a wiping action on any build-up of melted material on the drive shaft.

2. A pump support apparatus as claimed in claim 1 wherein the parallel columns are of prism shaped cross-section throughout their length.

3. A pump support apparatus as claimed in claim 1 wherein both the first and second support members are of cylindrical shape.

4. A pump support apparatus as claimed in claim 1 wherein the axis of the rotary drive shaft is offset from and parallel to a common center axis of the first and second support members.

5. A pump support apparatus as claimed in claim 1 wherein the first and second support members and the parallel columns are integrally formed of a single piece of material.

6. A pump support apparatus as claimed in claim 1 wherein one of the first and second support members has a recess for receiving the pump.

7. A pump support apparatus as claimed in claim 6 wherein the recess is adapted to hold the pump in close proximity to a bottom of the melter tank.

8. A pump support apparatus as claimed in claim 6 including a pump end plate which retains the pump in the recess.

9. A pump support apparatus as claimed in claim 1 including a thermal insulator attached adjacent to one of the first and second support members.

10. A pump support apparatus as claimed in claim 1 wherein the first support member is adapted to be positioned above a top portion of the melter tank and a journal bearing is formed by a bore in the first support member with the bore receiving the rotary drive shaft, whereby the journal bearing is adapted to be located above the level of any melted fluid in the melter tank to prevent fluid from climbing the rotary drive shaft as it rotates and leaking out of the top portion of the melter tank.

11. A pump support apparatus as claimed in claim 10 wherein the first support member is attached to a drive mount which is recessed above the top portion of the melter tank and the pump support apparatus extends downwardly through a hole in the top portion of the melter tank.

12. A pump support apparatus for supporting a pump within a melter tank for thermoplastic material, the apparatus comprising:
    - a support member for attachment to the melter tank and having a bore extending therethrough; and
    - a rotary drive shaft extending through the bore with a first end of the drive shaft connected to a rotary power device and a second end connected to the pump to drive the pump when the drive shaft rotates;
    - the bore in the support member forming a journal bearing with the drive shaft;
    - the support member being attached to the melter tank at a top portion of the tank to locate the journal bearing of the shaft at a location above the level of any melted fluid in the tank to prevent fluid from climbing the shaft as it rotates and leaking out of the top portion of the tank.

13. A pump support apparatus as claimed in claim 12 wherein the support member is attached to a drive mount which is recessed proximate the top portion of the melter tank and the pump support apparatus extends downwardly through a hole in the top portion of the tank.

14. A pump support apparatus as claimed in claim 12 including a thermal insulator attached to the support member to reduce heat transfer from the support member.

15. The combination of a melter tank for thermoplastic material and a pump support apparatus supporting a pump within the melter tank, the combination comprising:
    - said melter tank having a top, a bottom, and sidewalls extending between the top and bottom;
    - a drive shaft support member having at least one axial bore therethrough and mounted within the melter tank; and
    - a rotary drive shaft extending through the axial bore with a first end of the drive shaft connected to a motor shaft and a second end connected to the pump to drive the pump when the drive shaft rotates;
    - the drive shaft support member having open areas surrounding the drive shaft which permit portions of the drive shaft to come in contact with melted fluid material within the tank.

16. The combination claimed in claim 15 wherein the drive shaft support member has at least one vertical column located in close proximity to the drive shaft to interact with the drive shaft as it rotates and effect a wiping action on any build-up of melted material on the drive shaft.

17. The combination claimed in claim 16 wherein the rotation of the drive shaft interacting with the vertical column causes a mixing action of the melted material within the tank.

18. The combination claimed in claim 15 wherein the drive shaft support member has a journal bearing for rotatably supporting the drive shaft, said journal bearing being mounted above the level of any melted fluid in the tank to prevent fluid from climbing the shaft as it rotates and leaking out the top of the tank.

19. The combination claimed in claim 15 further comprising a pair of parallel vertical columns located in close proximity to the drive shaft.

20. The combination of a melter tank for thermoplastic material and a pump support apparatus for supporting a pump within the melter tank, the combination comprising:
    - said melter tank having a top, a bottom, and sidewalls extending between the top and bottom, the top of the tank having a pump assembly hole;

a drive mount attached to the top of the melter tank above the pump assembly hole;

a drive shaft support member having at least one axial bore therethrough and mounted vertically within the melter tank and having a top end attached to the drive mount and a bottom end attached to the pump; and a rotary drive shaft extending through the axial bore with a top end of the drive shaft connected to a motor shaft and the bottom end connected to the pump to drive the pump when the drive shaft rotates;

the drive shaft support member having an open area adjacent the drive shaft which permits the drive shaft to come in contact with melted fluid material within the tank.

21. The combination claimed in claim 20 wherein the drive shaft support member has a recess at the bottom end thereof for receiving the pump mechanism and an end plate attached to the bottom end for retaining the pump mechanism within the recess.

22. The combination claimed in claim 20 wherein the drive shaft support member has an upper journal bearing for rotatably supporting the drive shaft, said upper journal bearing being mounted above the top of the melter tank and above the level of any melted fluid in the tank to prevent fluid from climbing the shaft as it rotates and leaking out the top of the tank.

* * * * *

UNITED STATES PATENT AND TRADEMARK OFFICE
CERTIFICATE OF CORRECTION

PATENT NO. : 5,927,555
DATED : July 27, 1999
INVENTOR(S) : William A. Harben et al.

It is certified that error appears in the above-identified patent and that said Letters Patent is hereby corrected as shown below:

In column 2, line 1, change "the to" to --to the--.

In column 4, line 23, change "receess" to --recess--.

In column 4, line 45, change "in" to --is--.

In column 4, line 49, change "of" to --from--.

In column 4, line 55, change "remained" to --remaining--.

In column 8, claim 21, lines 3 and 4, delete "mechanism".

In column 8, claim 22, line 4, delete "the top of the melter tank and above".

Signed and Sealed this

Twenty-third Day of January, 2001

Attest:

*Attesting Officer*

Q. TODD DICKINSON

*Commissioner of Patents and Trademarks*